(No Model.)
J. W. MULLINS.
CULTIVATOR AND PLANTER.
No. 495,901. Patented Apr. 18, 1893.
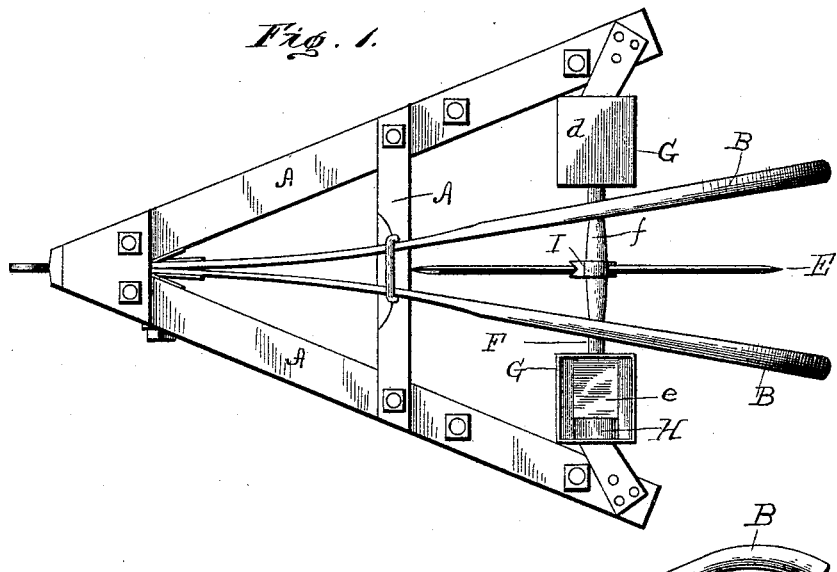
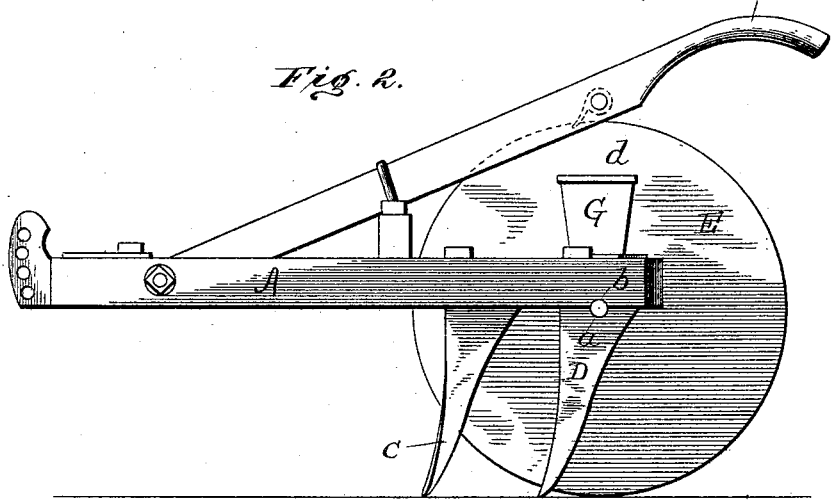
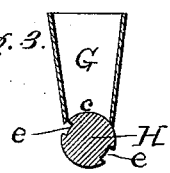
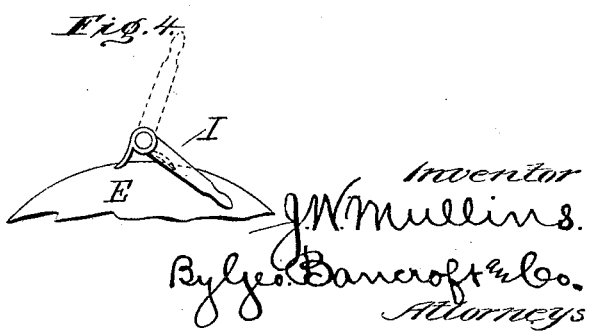
Witnesses
Edwin L. Bradford
Edw'd R. Coury
Inventor
J. W. Mullins
By Geo. Bancroft & Co.
Attorneys
THE NORRIS PETERS CO., PHOTO-LITHO., WASHINGTON, D. C.

UNITED STATES PATENT OFFICE.

JOHN W. MULLINS, OF FARISTON, KENTUCKY.

CULTIVATOR AND PLANTER.

SPECIFICATION forming part of Letters Patent No. 495,901, dated April 18, 1893.

Application filed November 12, 1892. Serial No. 451,799. (No model.)

*To all whom it may concern:*

Be it known that I, JOHN W. MULLINS, a citizen of the United States, residing at Fariston, in the county of Laurel and State of Kentucky, have invented certain new and useful Improvements in a Combined Cultivator and Planter; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in cultivators and planters and has for its object the production of an agricultural implement which is especially efficacious and convenient in its use and operation as a combined cultivator and planter, or equally as well adapted for use as either irrespective of the other.

The invention will be hereinafter described and particularly pointed out in the claims.

In the accompanying drawings which form part of this specification: Figure 1, represents a plan view of my invention; Fig. 2, a side elevation thereof; Fig. 3, a transverse vertical section through one seed-hopper and feeding cylinder, and Fig. 4, a side view of a bifurcated brake for use on the colter wheel, modified by the addition of an operating lever.

Reference being had to the drawings and letters thereon A, A, represent a frame or beam formed of two rearwardly diverging members connected by a third at a point intermediate from each end, the whole being securely bolted together and provided with the usual clevis at the forward end.

B, B, indicate plow handles of ordinary construction; C and D cultivator teeth arranged in pairs on either side of the longitudinal center of the implement, presenting faces at reversed angles, and bolted to the frame A, in any approved manner.

E, is a colter-wheel keyed to a shaft F, which latter finds bearings in recess $a$ formed in the upper end of each of the rear cultivator teeth D, and corresponding recesses $b$ in the under sides of the rear ends of frame A. Near the rear ends of said frame also, and therefore in close proximity to the rear or covering tooth D, on each side of the frame are rigidly secured hoppers G, G, having openings $c$ in their bottoms and each being provided with a lid or cover $d$. Upon both ends of the shaft F, is secured a feeding cylinder H, each having a mutilated surface or recesses $e\ e$ diametrically opposite each other as shown in Fig. 3.

Upon the usual cross brace $f$, connecting the plow-handles B, B, is secured a reversible brake I, for controlling the movement of colter wheel E, said brake consisting of a bifurcated shoe journaled upon brace $f$, as its axis, adapted to be inverted and to straddle the edge of wheel E, either in front or in rear of its axis thus chocking same and preventing its revolution when it is desired to stop the feed of grain from the cylinder H, which revolve in unison with the said wheel E.

As a cultivator the use and operation of my invention are too apparent to require explanation; as a planter however the colter wheel in addition to its usual functions performs the important office, as will be seen by reference to Fig. 1, of automatically and periodically distributing seed at the proper time and place. It will be further observed when the end of a row is reached or when it may be desired to turn or to transport the implement without necessarily disturbing grain, the feed may be effectually stopped by engagement with the colter wheel of the brake as before specified. It is obvious also that the brake referred to may be provided with a short operating lever such as illustrated in Fig. 4, and in like manner many minor changes in the construction and arrangement of parts may be made and substituted for those herein shown and described without departing from the spirit of my invention, which having been thus described

What I claim is—

1. In a cultivator and planter the combination of a frame, cultivator teeth, a colter wheel, and a reversible brake secured to the frame and adapted to engage the wheel, substantially as described.

2. In a cultivator and planter a frame, cultivator teeth secured thereto, a colter wheel, a bifurcated reversible brake journaled upon the frame and adapted to engage the wheel; in combination with a seed hopper having a discharge opening in its base, a mutilated feeding cylinder revolving within said opening and secured to the colter wheel shaft, substantially as described.

In testimony whereof I affix my signature in presence of two witnesses.

JOHN W. MULLINS.

Witnesses:
T. P. COLDWELL,
A. A. IRY.